Oct. 6, 1959 — R. G. NORMAN — 2,907,415
AUTOMATIC BRAKING DEVICE
Filed July 11, 1955 — 2 Sheets-Sheet 1
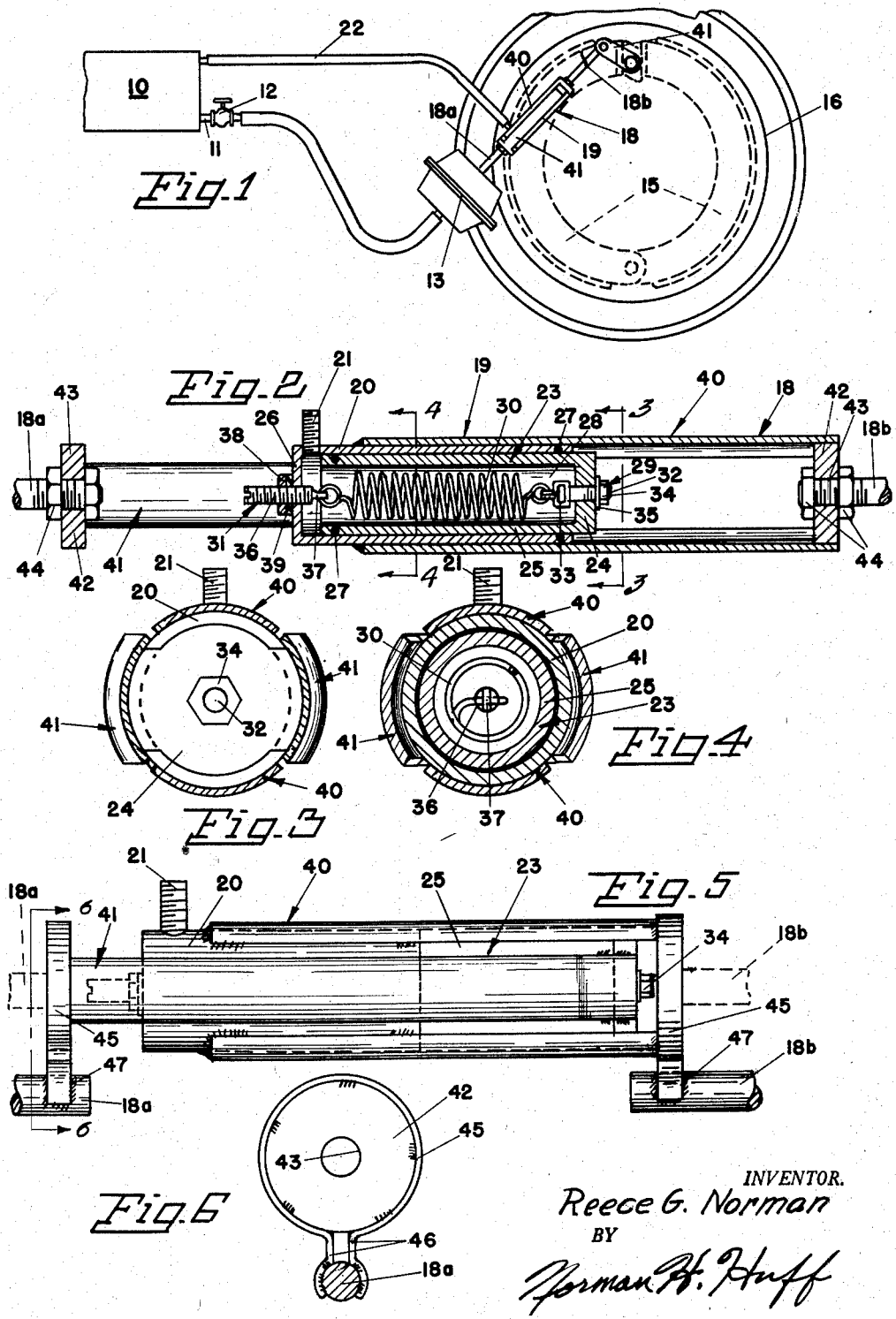
INVENTOR.
Reece G. Norman
BY
Norman H. Huff

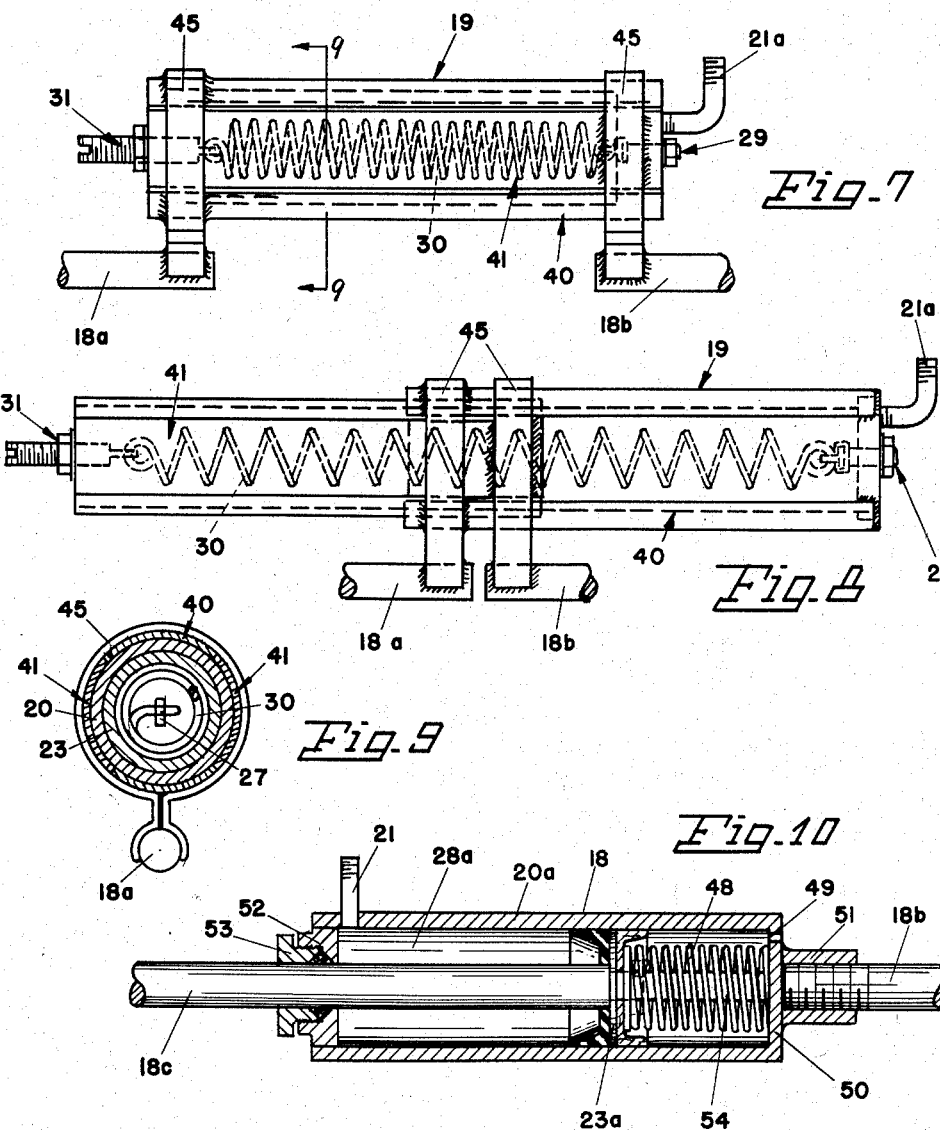

United States Patent Office 2,907,415
Patented Oct. 6, 1959

2,907,415

AUTOMATIC BRAKING DEVICE

Reece Gilbert Norman, Richland, Wash., assignor to John S. Crowder, Richland, Wash.

Application July 11, 1955, Serial No. 521,231

5 Claims. (Cl. 188—151)

This invention is an automatic braking device for fluid brakes of the type having a fluid reservoir such as air brakes or vacuum brakes.

The principal object of the invention lies in the provision of an automatic braking device which is adapted to automatically apply the brakes of a vehicle when the fluid medium of the braking system is dangerously reduced from its normal operating pressure.

Another object of the invention lies in the provision of an automatic braking device wherein the brake rod includes a fluid motor which is resiliently biased to change the length of the rod so as to apply the brakes and has fluid operated means for counteracting the resilient bias when the brake operating fluid pressure is within a desired operating range.

Another object of the invention lies in the provision of an automatic braking device which is easily applicable to the existing brake rods of a vehicle having air or vacuum brakes so that it may be installed with a minimum amount of labor and time expended.

Yet another object of the invention lies in the provision of an automatic braking device having a minimum number of parts which may be assembled with facility and therefore one which is very inexpensive and yet very effective for its purpose.

Throughout this work I refer to fluid pressure and I desire that it shall be understood that this term is not intended to limit the scope of this invention to systems having air under pressure such as air brakes but desire also to include such other braking systems as may logically fall within the province of this invention even though the pressure may be minus atmospheric such as is found in conventional vacuum brakes.

A greater understanding of the invention and its objects will become apparent during the study of the following specification taken in conjunction with the drawings wherein a preferred form of the invention and selected modifications are disclosed throughout the specification and drawings and like numerals are employed to designate like parts. In the drawing:

Figure 1 is a diagrammatic view of a braking system including the automatic braking device constituting the subject matter of the present invention;

Figure 2 is a longitudinal cross-section taken through one form of the braking device diametrically thereof;

Figure 3 is a transverse cross-section as at line 3—3 of Figure 2;

Figure 4 is a view similar to Figure 3 taken at line 4—4 of Figure 2;

Figure 5 is a side elevation of a modified form of braking device;

Figure 6 is a view as at line 6—6 of Figure 5;

Figure 7 is a further modified side elevation;

Figure 8 is a side elevation of the modification shown in Figure 7, wherein the chamber is expanded as by air pressure;

Figure 9 is a cross-section as at line 9—9 of Figure 7; and

Figure 10 is a longitudinal view partially in cross-section showing a still further modified form of the invention.

Referring now in greater detail to the drawings it will be seen in Figure 1 that I have provided a tank or reservoir 10, which for convenience of description will be considered as an air pressure tank for braking systems employing air pressure but which it will be understood could be a vacuum tank when employed on the vacuum type brakes. The reservoir 10 is provided with a conduit connection such as 11 in which is interposed a valve 12, the valve is of conventional air brake valve construction and is not detailed herein since it is commonly known in the art among those who are skilled in this particular field.

When the valve 12 is opened, air under pressure is metered to the diaphragm of the power chamber or fluid motor 13 which normally actuates a conventional brake rod to push the brake lever 14 and thereby expand the brake shoes 15 to bear against the brake drums 16 and thereby supply braking pressures to the wheels of the vehicle.

In the present invention I substitute an improved brake rod 18 which includes a fluid operated motor 19 disposed in the effective length of the brake rod 18 and adapted to vary the over-all length of the rod under certain conditions.

Inspection of Figure 2 will reveal that the fluid motor 19 has a cylinder 20 which is provided with a conduit connection 21 by means of which the fluid under pressure is communicated from the reservoir 10 through the conduit 22 to the cylinder 20. A piston 23 has a piston head 24 and a tubular skirt 25 which is telescopically slidable in the cylinder 20. The cylinder 20 is provided with a cylinder head at 26 and the telescopic union of the cylinder 20 and piston 23 is provided with conventional O rings 27—27 which seal the chamber 28 defined within the cylinder 20 and piston 23.

Means 29 are provided in the piston head 24 for securing one end of a tension spring 30. Adjustable means 31 are provided in the cylinder head 26 for securing the opposed end of the tension spring 30. Inspection of Figure 2 will reveal that the tension spring 30 resiliently biases the cylinder 20 and the piston 23 to a retracted position as shown wherein the chamber is reduced to its smallest cubic capacity. Obviously when air from the reservoir 10 is admitted into the chamber 28 through the conduit 22 and connection 21, and said air under pressure is of sufficient pressure to overcome or counteract the action of the spring 30, the cylinder 20 and piston 23 are extended to their limits thus expanding the chamber 28 to its largest cubic capacity.

The means 29 are seen to be a bolt 32 which extends through an axial bore in the piston head 24 and at its inner end has a swivel 33 and at its outer end receives a nut 34. A sealing washer of rubber or similar material 35 is disposed between the nut 34 and the piston head 24 so that passage of fluid about the bolt is precluded.

The means 31 are seen to be an externally threaded bolt 36 having an apertured axially extending tongue 37 on its inner end to receive the eye of the spring 30 and also is provided with a nut 38 at the outer end and a sealing gasket 39 disposed between the nut and the cylinder head 26. The cylinder head is bored axially thereof and internally threaded to receive the bolt 36, and the nut 38 is provided to lock the means 31 against accidental displacement. It is thus obvious that the tension of the spring 30 may be manually adjusted as desired to insure proper operation of the automatic braking device and correlation of pressures with respect to the fluid pressures suitable for operation of the conventional brakes.

When the present device is employed in air brakes wherein the brake rod 18 is pushed by the motor 13 to actuate the brake lever 41 it is necessary that the fluid motor 19, under normal operating conditions, be constructed to result in the brake rod 18 being its greatest length and therefore it is obvious that expansion of the chamber 28 must necessarily retract or draw in the end portions 18a and 18b of the brake rod 18. To accomplish this I provide juxtaposed yokes indicated in general by the numerals 40 and 41 and it will be seen that their inner ends are secured to the cylinder or piston which is adapted to move in a direction away from its respective yoke under admission of air pressure into the cylinder. As seen in Figure 2 the yoke 40 has its ends secured to the cylinder 20 and the yoke 41 has its ends secured to the piston 23 opposed to the piston and cylinder 20.

The yokes are provided with cross heads 42 which have axial bores 43 adapted to receive the sections 18a and 18b of the brake rod 18. Locking nut assemblies 44 are applied to the threaded end portions of the sections 18a and 18b to rigidly unite them with the yokes. It is obvious therefore that when air under pressure is introduced into the chamber 28 the cylinder 20 and piston 23 expand thus drawing the yoke cross heads 42 inwardly and shortening the over-all length of the brake rod 18. When the air under pressure is exhausted from the chamber 28 the tension spring 30 draws the cylinder 20 and the piston 23 together thus expanding or separating the cross heads 42 of the yokes 40 and 41 and thus varying the length of the brake rod 18 by extending it. This extension or lengthening automatically applies the brakes of the vehicle.

As seen in Figures 5 and 6 it is sometimes desirable to add the fluid motor 19 disposed axially off set from the common axis of the rod sections 18a and 18b and in so doing I employ a securing bracket 45 which encircles the cross heads 42 and is welded thereto and is provided with radially extending extensions 46 which are welded or otherwise secured at 47 to the rod sections 18a and 18b as shown in full lines of Figure 5 instead of being axially united thereto as shown by full lines of Figure 2 and dotted lines of Figure 5.

When it is desired to remove as little of the brake rod section as possible I apply the motor 19 as shown in Figures 7 and 8. In Figure 8 the chamber 28 is expanded thus positioning the rod sections 18a and 18b in close proximity and resulting in the rod 18 having its shortest over all length while Figure 7 discloses the motor 19 with the air exhausted and the chamber 28 having its smallest cubic capacity wherein the rod sections 18a and 18b are separated and the braking rod 18 has its longest over all length.

It will be noted that the conduit connection 21a in this structure may communicate the chamber 28 through either the cylinder head 26 or the piston head 24 as desired.

In Figure 10 a further modified form of the invention is disclosed wherein the yokes 40 and 41 are omitted and one rod section 18c is substituted for one of the previously described rod sections, for instance 18a, and this rod section 18c extends into the cylinder 20a and carries a piston 23a. A compression spring 48 is disposed in a cylinder 20a on the side of the piston 23a opposed to the chamber 28a. In the area in which the spring 48 is disclosed I provide a vent 49 through the end wall 50 of the cylinder 20a to permit egress and ingress of air during movements of the piston.

The end wall 50 also carries an internally threaded sleeve 51 which is threaded upon the externally threaded end portion of the rod section 18b.

At its opposed end the cylinder 20a is provided with a head 52 which has a packing gland 53 formed therein thus providing means for permitting reciprocation of rod 18c therethrough and yet preventing fluid passage about the rod 18c.

Rod 18c has a reduced extension 54 which contacts the end wall 50 of the cylinder 20a and restricts the telescopic or inward movements of sections 18b or 18c toward each other and as seen in Figure 10 the rod 18 is in its shortest overall length. Upon release of fluid pressure from chamber 28a the compression spring 48 will expand forcing the piston 23a to reduce the chamber 28a and lengthen the rod 18 by spreading sections 18c and 18b.

It is thus obvious that when air pressure in the reservoir 10 is reduced to a point where it is dangerous to operate the vehicle the braking mechanism will automatically lengthen the brake rod 18 and thus actuate the brake lever 14 and apply the brake shoes 15 to the brake housing 16. It will therefore be impossible for one to operate the vehicle when the air pressure is not sufficiently high to adequately provide means for controlling the brakes of the vehicle.

Obviously the parts may be reversed in the event the braking device is to be employed upon a vacuum type braking system. That is, the tension springs 30 may be replaced by compression springs. The compression spring 48 may be replaced by a tension spring. The compression spring 48 may be placed in the chamber 28a instead of in its present location.

Having thus described my invention I claim:

1. A vehicle braking system comprising a fluid conduit including a reservoir containing a fluid at normal working pressures and a motor operable by said fluid through a valved connection to extend a reciprocal brake rod; a fluid operated motor constituting at least a portion of said reciprocal brake rod and adapted to vary the length thereof in accordance with fluid pressure in said reservoir; resilient means associated with said second named motor to bias said motor toward a braking position; and a conduit communicating said second named motor and said reservoir so as to urge said motor toward a brake releasing position when the reservoir contains fluid at normal working pressures.

2. In a fluid operated vehicle braking system including a source of fluid under pressure communicating with a brake operating fluid motor through manually controllable means and a mechanical member effective to actuate the braking mechanism, and a divided brake rod operably interconnecting said brake operating fluid motor and said mechanical member, the improvement in which said brake rod is provided as at least one element with a fluid pressure motor comprising a cylinder closed at one end and having means for communicating a fluid conduit therewith; a piston having an elongated cylindrical skirt reciprocally slidable in said cylinder and together with said cylinder defining an expandable chamber; a tension spring disposed in said chamber for urging said cylinder and said piston to their retracted positions; longitudinally extending juxtaposed yokes fixed one to each portion of said divided brake rod and secured respectively to the cylinder and to the piston of said cylinder for spreading movement during retracting movement of said cylinder and piston whereby fluid under pressure introduced into said motor will effect enlargement of said chamber to overcome the tension of said spring and reduce the effective length of said rod; and means communicating said fluid pressure motor with said source of fluid under pressure.

3. For a brake system, a fluid pressure motor comprising a cylinder closed at one end and having means for communicating a fluid conduit therewith; a piston having an elongated cylindrical skirt reciprocally slidable in said cylinder and together with said cylinder defining an expandable chamber, a tension spring disposed in said chamber for urging said cylinder and said piston to their retracted positions; longitudinally extending juxtaposed yokes adapted for securing at each outer end and inwardly secured respectively to the cylinder and the piston of said cylinder for spreading movement during retracting movement of said cylinder and piston, whereby fluid under pressure introduced into said motor will effect enlargement of said chamber to overcome the tension of said spring and reduce the effective overall length of said pressure motor.

4. In a vehicle braking system including a fluid conduit having a valving means and a motor operably connected to actuate a reciprocal brake rod, a safety device comprising a fluid operated motor physically constituting at least a portion of said reciprocal brake rod intermediate its ends and adapted to vary the length thereof; resilient means effective to bia said second named motor toward a braking position; and a conduit communicating said second named motor with said first named conduit on the side of said valve opposed to said first named motor to urge said second named motor toward a brake-releasing position when the second named conduit contains fluid at normal working pressures.

5. The combination with a vehicle braking system having a fluid conduit including a reservoir of actuating fluid normally maintained under working pressure and a fluid actuable motor operably connected for actuation by said fluid and controlled by a manually actuated valve; and a vehicle brake, of an improved brake actuating rod operably connected between said motor and said brake to impart braking movements to said brake from said motor; said rod including a fluid operated expansion motor connected to the rod and operable to vary the length of the rod coincident to a predetermined fluid pressure change in said last named motor; and means communicating the fluid pressure from said reservoir to said last named motor.

References Cited in the file of this patent

UNITED STATES PATENTS

| | | |
|---|---|---|
| 1,528,966 | Berger | Mar. 10, 1925 |
| 1,650,963 | Schauman et al. | Nov. 29, 1927 |
| 2,368,517 | Brimble | Jan. 30, 1945 |
| 2,459,938 | Higgins | Jan. 25, 1949 |
| 2,479,532 | Wemp | Aug. 16, 1949 |
| 2,754,805 | Beman | July 17, 1956 |

FOREIGN PATENTS

| | | |
|---|---|---|
| 466,407 | Great Britain | May 27, 1937 |